US011953130B2

United States Patent
Lofgren et al.

(10) Patent No.: US 11,953,130 B2
(45) Date of Patent: Apr. 9, 2024

(54) COLLAR ASSEMBLY FOR FIXING A TUBULAR ARTICLE ONTO AN EXTERNAL SUPPORT

(71) Applicant: AKWEL SWEDEN AB, Varberg (SE)

(72) Inventors: Cécilia Lofgren, Varberg (SE); Jan Olofsson, Varberg (SE)

(73) Assignee: AKWEL SWEDEN AB, Varberg (SE)

( * ) Notice: Subject to any disclaimer, the term of this patent is extended or adjusted under 35 U.S.C. 154(b) by 0 days.

(21) Appl. No.: 17/871,238

(22) Filed: Jul. 22, 2022

(65) Prior Publication Data

US 2023/0046790 A1     Feb. 16, 2023

(30) Foreign Application Priority Data

Jul. 22, 2021   (FR) ...................................... 2107952

(51) Int. Cl.
    *F16L 3/12*     (2006.01)
(52) U.S. Cl.
    CPC .................................. *F16L 3/1222* (2013.01)
(58) Field of Classification Search
    CPC .... F16L 3/1222; F16L 3/1233; B21D 39/046; B21D 39/048; B60R 16/08
    See application file for complete search history.

(56) References Cited

U.S. PATENT DOCUMENTS

| | | | | |
|---|---|---|---|---|
| 2,250,280 A * | 7/1941 | Starbird | ................... | H01R 4/26 439/100 |
| 3,564,676 A | 2/1971 | Konrad | | |
| 5,009,376 A * | 4/1991 | Usui | ..................... | F16L 55/035 248/74.1 |
| 8,439,317 B2 * | 5/2013 | Sampson | .............. | F16L 3/1083 248/74.3 |
| 9,482,369 B2 * | 11/2016 | Sampson | ................. | F16L 3/127 |
| 10,668,878 B1 * | 6/2020 | Sampson | ................ | B60R 16/08 |
| 2012/0137494 A1 * | 6/2012 | Deterre | ................. | F16L 3/1222 29/700 |

(Continued)

FOREIGN PATENT DOCUMENTS

| | | | | |
|---|---|---|---|---|
| DE | 102018109617 A1 * | 10/2019 | ............ | F16L 23/003 |
| DE | 102018109617 A1 | 10/2019 | | |
| WO | WO-2011036381 A1 * | 3/2011 | ............ | F16L 3/1222 |

OTHER PUBLICATIONS

Davis instrument quick fist rubber clamp sold on amazon.com dated Oct. 1, 2001 (Year: 2001).*

(Continued)

*Primary Examiner* — Terrell L McKinnon
*Assistant Examiner* — Ding Y Tan
(74) *Attorney, Agent, or Firm* — Oliff PLC (57) ABSTRACT

A cylindrical cavity for receiving the tubular article and a metal casing body delimiting a seat substantially inside which the insert is wrapped around the article, the insert having an external projection which extends radially towards the exterior of the insert and is configured to cooperate with a corresponding orifice formed in the seat of the metal body so as to position the insert inside the body, the projection comprising a base attached to the insert and a head provided at the periphery of the head with a protruding clipping edge configured to hold the insert inside the metal casing body. The insert has, at the base of the projection, a through hole extending in line with the clipping edge.

11 Claims, 5 Drawing Sheets

(56) References Cited

U.S. PATENT DOCUMENTS

2016/0009469 A1* 1/2016 Schneider De Oliveira ................
  B65D 63/1027
  248/74.3
2017/0030487 A1* 2/2017 Sampson .............. F16L 55/035
2018/0326933 A1* 11/2018 Pahisson ............. B60R 16/0215

OTHER PUBLICATIONS

Mar. 8, 2022 Search Report issued in French Patent Application No. 2107952.

* cited by examiner

COLLAR ASSEMBLY FOR FIXING A TUBULAR ARTICLE ONTO AN EXTERNAL SUPPORT

TECHNICAL FIELD

The present invention relates to a collar assembly for clamping and fixing onto a support at least one tubular article, for example a pipe through which a fluid flows, such as a pipe of a fuel system, braking system, cooling system or the like in a motor vehicle or similar.

Such fixing or clamping collars are largely used for fixing tubular elements, such as pipes, to various structures. A well-known example of its use consists of fixing a pipe to an engine or a chassis in a vehicle. Usually, a fixing collar assembly comprises, on the one hand, a tubular element, including at least one pipe part surrounded by an elastomer sleeve, and on the other hand, a casing body made from a metal band which surrounds and clamps the tubular element around the sleeve.

The clamping of the tubular element in the support is usually achieved by shaping the casing metal body to have a generally U-shaped form so as to create a substantially cylindrical recess between two projecting legs and then inserting the tubular element into the recess, and finally pressing and securing the legs against one another, with additional fastening means such as a screw, a rivet, a bent tab, welding wire or the like, so as to firmly clamp the tubular sub-assembly inside the recess.

PRIOR ART

In particular from the publication of patent application U.S. Pat. No. 5,806,813, a clamping collar assembly is known for mounting tubes, in particular circular tubes onto a support element. The collar assembly comprises an annular element, generally with a C shape, forming a clamping body and a fixing element which is connected to the clamping body by welding. By using an engaging ring in the form of a C, the support can be adjusted radially and linearly on the tube to ensure a correct alignment.

The function of the fixing element is to maintain the tension in the clamping body once the clamping body has been positioned around the tube. This assembly has many disadvantages.

On the one hand, this assembly requires a welding operation to attach the clamping body and the mounting element assembly. Furthermore, the clamping body has little flexibility for adjusting to different tube diameters. Lastly, the collar assembly is in two parts which have to be welded together so that special precautions and tools are necessary. This results in increased installation time.

Another standard method for mounting a fixing or clamping collar assembly around a tubular article, is described in the patent publication U.S. Pat. No. 9,482,369 B2. This method consists of assembling a metal collar and a sleeve to form a clamping collar assembly. The metal collar is formed by a curved shape which defines a cavity and includes a through slot.

The sleeve is received inside the cavity of the collar and comprises an oblong projection extending radially towards the exterior of the sleeve. This projection is received by an orifice formed in the metal collar to enable the positioning of the sleeve relative to the metal collar. The user curves the metal collar around the sleeve until it reaches a closed position to secure the collar assembly around the tube. The closed position of the metal collar is maintained by plastic deformation of the metal collar without any additional fixing.

SUMMARY OF THE INVENTION

The aim of the invention is to provide a clamping collar assembly which does not have the aforementioned disadvantages of the prior art documents. The invention proposes a robust fixing collar assembly which firmly holds the tubular article without any welding or soldering operation or other fixing elements.

For this purpose, the subject-matter of the invention is a collar assembly for fixing at least one tubular article to an external support, of the type comprising a deformable insert for defining a substantially cylindrical cavity configured to receive the tubular article and a metal casing body delimiting a seat substantially inside which the insert is wrapped around the article, the insert comprising an external projection which extends radially towards the exterior of the insert and is configured to cooperate with a corresponding orifice formed in the seat of the metal body so as to position the insert inside the body, the projection comprises a base attached to the insert and a head connected to the base by a radially extending connecting part and provided at the periphery of the head with a protruding clipping edge configured to hold the insert inside the metal casing body, characterised in that the insert comprises, at the base of the projection, a through hole extending in line with the clipping edge.

The through hole is conveniently formed in the insert to allow the injection moulding of the protruding edge without the need for injection moulds that require complex accessories. One of the problems of the prior art overcome by the invention is in particular to enable the insert to be moulded without having to use additional mobile slides to form the area located below the clipping edge(s).

In addition, the fixing or clamping collar assembly according to the present invention overcomes the aforementioned problems by providing a deformable insert which is easy to produce and which is easy to preassemble with the casing body.

In another embodiment of the invention, the connecting part radially connects the head according to an external profile without any edge or shoulder.

In another embodiment of the invention, the assembly comprises two protruding clipping edges opposite one another and two corresponding through holes formed in said base.

In another embodiment of the invention, the two lateral through holes are joined and form a single through hole extending below the head.

In another embodiment of the invention, the connecting part comprises two flexible skirt sections arranged around the through hole and opposite one another.

In another embodiment of the invention, the connecting part is in the form of a membrane joining the head and the base of the insert. The flexible part in the form of a membrane can stretch and flex during the insertion to enable the flexing edges to hook through the orifice or slot formed in the casing body.

In another embodiment of the invention, the head is formed by a hollow body.

In another embodiment of the invention, the head extends substantially in the radial extension of the through hole and the connecting part connects the head to the base at the periphery of the through hole.

In another embodiment of the invention, the head is supported at a radial distance from said base by the connecting part and extends substantially over the entire surface of the through hole.

In another embodiment of the invention, the head of the projection has a solid form with four lateral sides, two opposite sides extending laterally by two protruding clipping edges and the other two opposite sides extending laterally by two flexible skirt sections forming the connecting part.

In another embodiment of the invention, the insert is elastically deformable between an open undeformed position and a closed deformed position, the insert having in open position a generally semi-tubular shape with a U-shaped cross-section having a base and side walls, the projection being supported by the base of the insert.

BRIEF DESCRIPTION OF THE DRAWINGS

Further features and advantages of the invention will become apparent from the following description, made with reference to the accompanying drawings in which.

DESCRIPTION OF EMBODIMENTS

Figure 1:
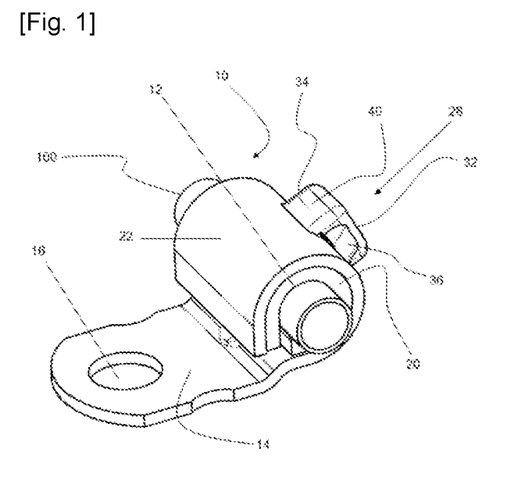
FIG. 1 represents a perspective view of a fixing assembly for a tubular article on a support according to a first viewpoint.

FIG. 1 shows a clamping collar assembly of the invention. The clamping collar assembly is denoted by the general reference numeral 10. In the embodiment shown in FIG. 1, the clamping collar assembly 10 is used to support a tubular article such as the tube 100 which can be a rigid tube, a flexible pipe or electric wiring among other components.

In other embodiments, the tube 100 can be replaced by any other type of element to be supported. In this example, the clamping collar assembly 10 is intended to hold a cooling line, a fuel line or a brake line of an automobile.

According to the invention, the clamping collar assembly 10 comprises a clamping area 12 or housing, which has a substantially cylindrical annual general shape, for engaging around the article 100.

The clamping collar assembly 10 also comprises a fixing tab 14 arranged to fix the tubular article 100 to an external support (not shown), for example a piece of equipment of a motor vehicle by different techniques. These techniques for fixing to the support can comprise, without being limited thereto, adhesion, soldering or welding. In the preferred embodiment of the invention, the clamping collar assembly 10 is fixed to the external support for example by means of a threaded fastener.

Preferably, the fixing tab 14 comprises in this example one or more fixing holes 16. For example, this fixing hole 16 makes it possible to fix the assembly 10 to an external support structure, for example a chassis or an engine block, by means of a fixing element such as a screw (not shown).

Figure 2:
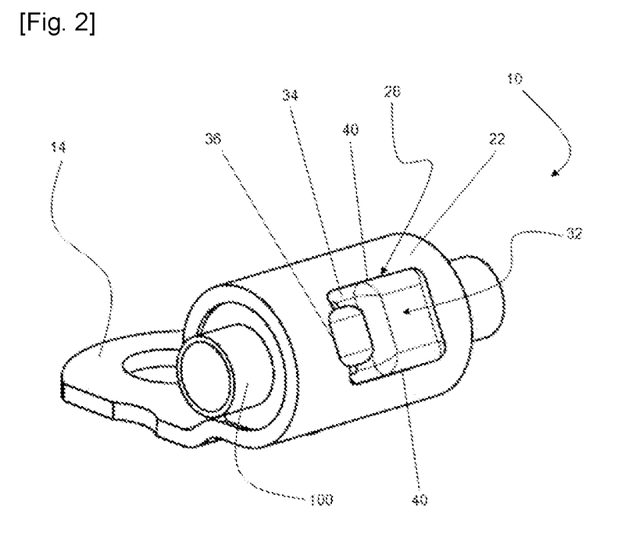
FIG. 2 represents a perspective view of the fixing assembly according to a second viewpoint.
Figure 3:
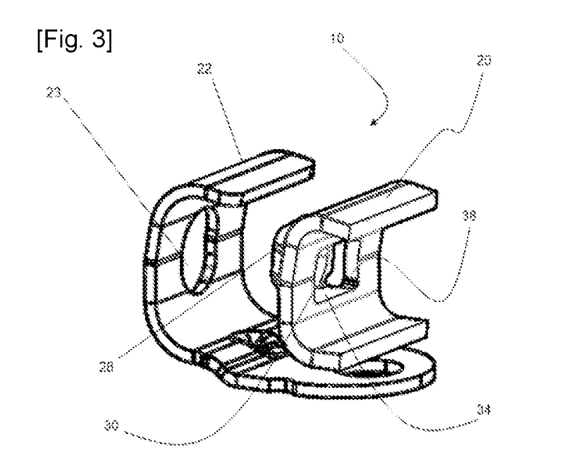
FIG. 3 represents a perspective view of the fixing assembly in a non-assembled configuration.

With reference to FIGS. 1 and 2, the clamping collar assembly 10 comprises a deformable insert 20 for defining the substantially cylindrical clamping area or cavity 12 for receiving the tubular element 100. The assembly 10 further comprises a peripheral metal body 22 or casing body 22 which is folded to form a generally U-shaped recess which encases the insert 20.

The insert 20 is dimensioned to be fixed to the casing support 22 and conform to the outer diameter of the tube 100. The insert 20 is made for example from a moulded elastomer material. The type of elastomer material and the hardness can be selected as a function of the requirements of a specific application.

Figure 4:
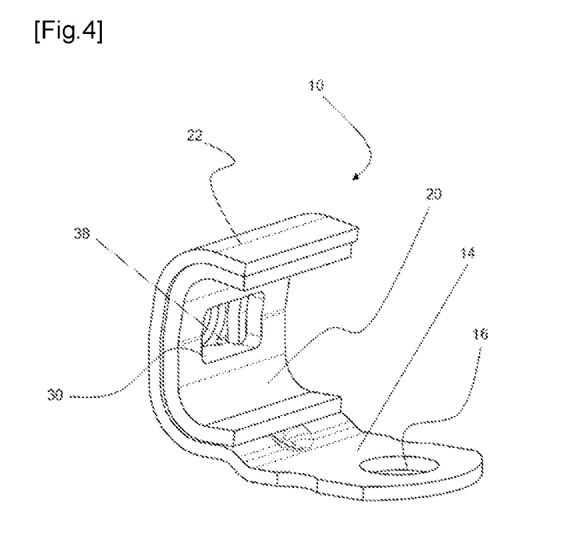
FIG. 4 represents a perspective view of the fixing assembly in a preassembled configuration according to a first viewpoint.
Figure 5:
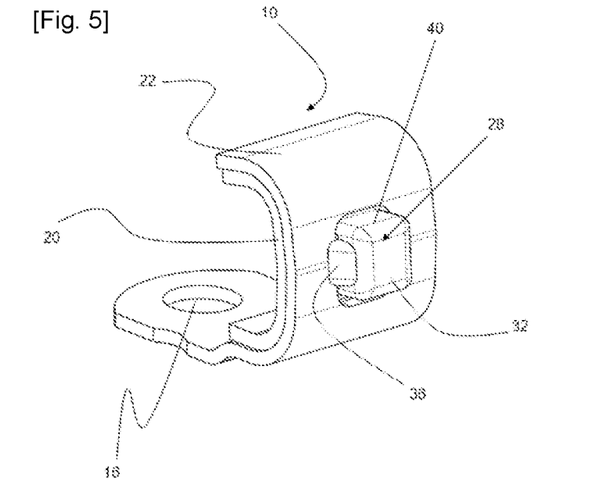
FIG. 5 represents a perspective view of the fixing assembly of FIG. 4 according to a second viewpoint.
Figure 6:
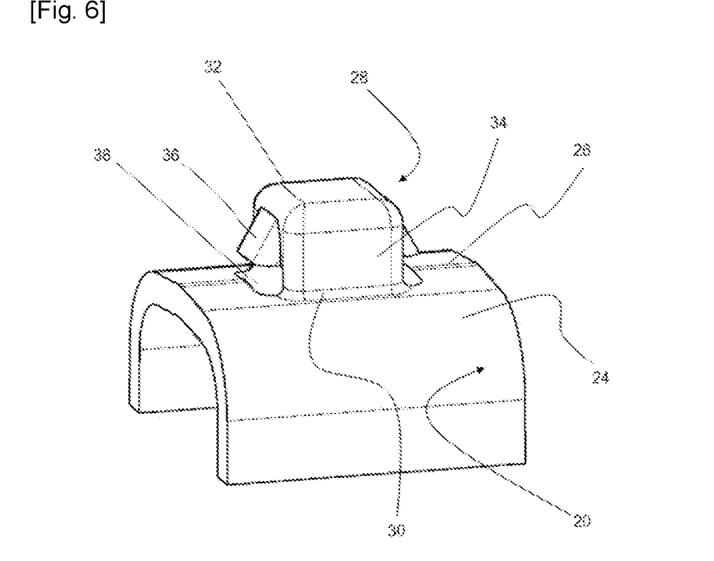
FIG. 6 represents a perspective view of the insert of the fixing assembly shown in FIG. 1.

The insert 20 is moulded in an open position, illustrated for example in FIGS. 4 to 6, and is deformable elastically between this open position (undeformed state) and a closed position (deformed state).

In the open position, the insert 20 has a generally semi-tubular shape with a U-shaped cross-section with a base 26 and side walls 24. The insert 20 is open along its length. The insert 20 is configured such that when it is closed, as shown in FIG. 1 or 2, the insert 20 preferably has a generally cylindrical form with a round cross-section with a circular inner diameter which forms the cylindrical cavity of the clamping collar assembly 10.

With reference to FIG. 6, the insert 20 comprises a radial projection 28 extending radially towards the exterior of the insert 20. The radial projection 28 extends from a medial portion of the base 26 of the insert 20.

As shown in FIG. 4 or 5, the casing body 22 provides a generally U-shaped curved or casing part in which an orifice 23 is arranged. The orifice 23 is dimensioned for receiving the radial projection 28 and is configured to cooperate with the projection 28 in order to position the insert 20 relative to the casing body 22.

The projection 28 comprises a base 30 fixed to the insert 20 and a head 32 connected to said base 30 by a connecting part 34 extending radially. The projection 28 is provided, at the periphery of the head 32, with a projecting clipping edge 36 for holding the insert 20 in place relative to the metal casing body 22.

The radial projection 28 helps to hold the insert 20 inside the casing body 22 in an open position. The radial opening 28 is dimensioned such that the dimension in at least one direction of the head 32 is greater than the width of the slot or orifice 23 of the clamping casing body 22. Consequently, when in use, the head 32 is deformed temporarily to pass through the slot 23, then the head 32 returns to its initial form for holding the insert 20 on the casing body 24. The projection 28 holds the insert 20 inside the casing body 22, which makes it possible for the clamping collar assembly 10 to be delivered pre-assembled in an open position (FIGS. 4-5).

The clamping collar assembly 10 is configured to close around the tubular article 100 by a forming tool 200 so as to be folded around the article 100.

In a preferred manner, the insert 20 comprises, at the base 30 of the radial projection 28, a through hole 38 aligned radially below the projecting clipping edge 36.

In the example illustrated in the figures, the head 32 of the projection 28 preferably comprises two protruding clipping edges 36 opposite one another in longitudinal direction of the projection 28. Preferably, the insert 20 comprises, at the base 30 of the projection 28, two lateral through holes 38 aligned radially below each of the two protruding clipping edges 36. Of course, the insert 20 can comprise one or more through holes 38 as well as one or more protruding clipping edges 36 without departing from the scope of the invention.

Preferably, the lateral through holes 38 are joined and form a single through hole extending below the surface of the head 32. The single through hole has in this example an oblong form with a longitudinal direction extending along the protruding clipping edges 36.

The connecting portion 34 radially connects the head 32 with an outer profile free of any edge or shoulder. The connecting part 34 comprises for example two flexible skirt sections 40 arranged around the single through hole 38 and facing one another in a width direction of the head 32.

The contour of the head 32 is inscribed inside the through hole 38. Preferably, the contour of through hole 38 substantially follows the contour of the head 32. The head 32 is formed for example by a hollow body and extends above the through hole 38 of the insert 20. The head 32 extends above the through hole 38 and the connecting part 34 laterally connects the head 32 to the base 30 at the periphery of the through hole 38.

The head 32 of the projection 28 preferably has a solid shape with four lateral sides. In the example described, the head 32 comprises two opposite sides extending laterally through the two protruding clipping edges 36 and the two other opposite sides extending laterally through the two flexible skirt sections 40 forming the connecting portion 34. The solid form has in the present example, as illustrated in FIGS. 1-6, a general cube shape. Preferably, at least one clipping edge 36 has a profile with the general form of an inclined ramp facilitating the progressive introduction of the head 32 through the slot 23.

Preferably, the flexible connecting portion 34 has the form of a membrane which can stretch and flex during insertion in order to allow the flexing edges 36 to hook through the orifice 23 formed in the casing body 22.

Figure 7:
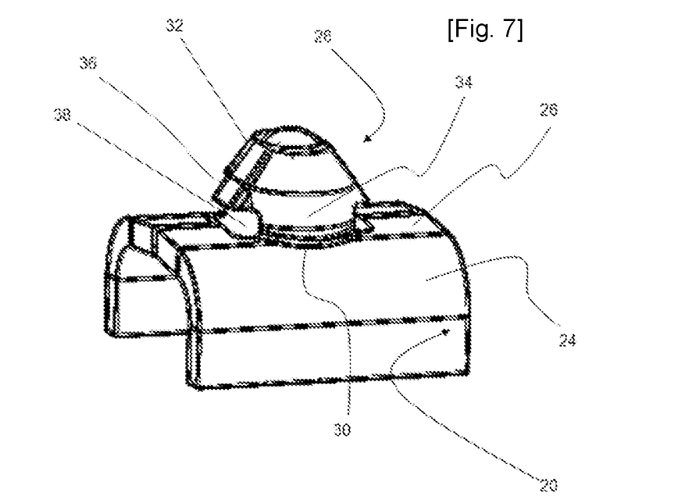
FIG. 7 represents a perspective view of a variant of the insert of FIG. 6.

In the variant illustrated in FIG. 7, the head 32 of the projection 28 can have the overall form of a truncated quadrilateral pyramid or may have any other structure or form to provide the clipping function.

Preferably, the insert 20 as a whole is formed by injection moulding an elastomer plastic material in a free mould cavity of a moulding die (not shown).

For manufacturing such an insert 20, the procedure is as follows. A moulding die comprising a mould is provided, for example in two parts, in order to delimit at least one free moulding cavity into which a plastic material can be injected in a molten state. This free mould cavity is configured to match the shape of the insert with the projection 28.

The mould is then closed and a molten plastic is injected into the mould. This plastic material fills the free cavity of the mould. Once the injection step has been completed, the mould is opened to remove the moulded insert 20. Due to the presence of at least one through hole 38 extending below the projecting edge 36 of the head 32 of the projection 28, the moulding process is greatly simplified as the removal from the mould is facilitated by the presence of the through hole 38.

Figure 8:
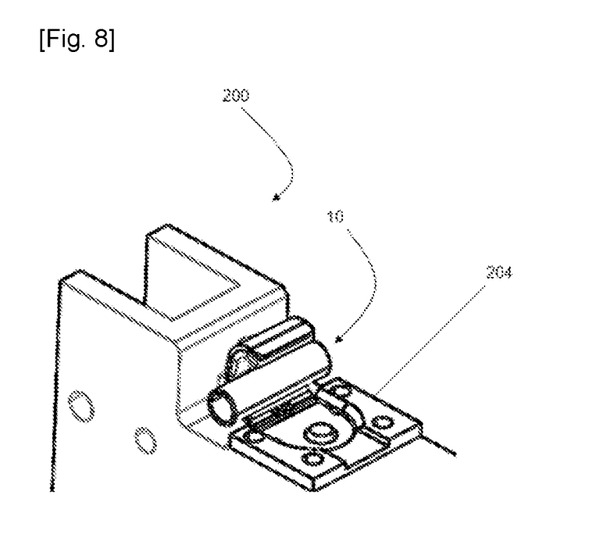
FIG. 8 represents a first step for assembling the device of FIG. 1.
Figure 9:
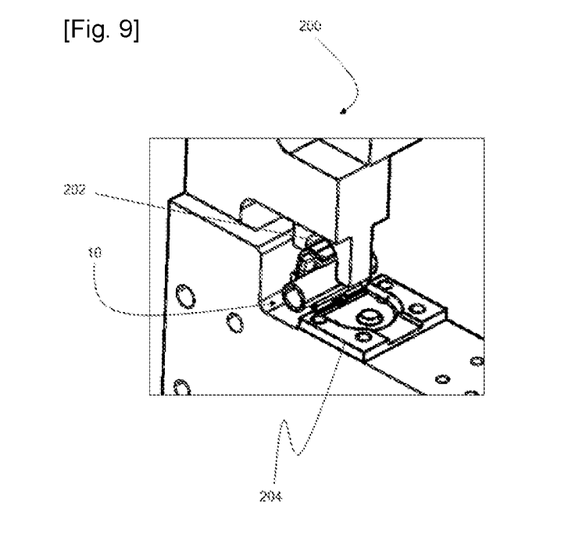
FIG. 9 represents a second step for assembling the device of FIG. 1.
Figure 10:
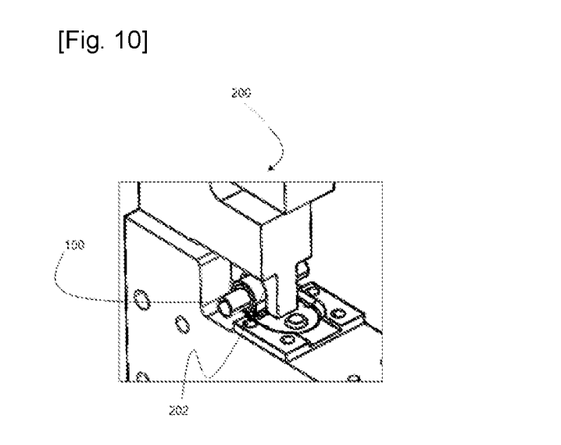
FIG. 10 represents a third step for assembling the device of FIG. 1.

FIGS. 8 to 10 illustrate a part of the method for assembling the clamping collar assembly according to the invention.

FIG. 8 illustrates a first step consisting of placing the metal clamp support 22 in a forming tool 200 which comprises a support 204 where the support assembly 10 is positioned. The support 204 comprises an axis or a mechanical device which cooperates with the additional hole 16 of the support assembly 10.

Furthermore, as illustrated in FIG. 9, the forming tool 200 comprises a U-shaped deforming clamp 202 which comprises a deforming surface for applying a clamping force to the body of the support casing 22 leading to its plastic deformation and the deformation of the elastomer insert 20 of the support assembly 10. Then, the tubular element 100 is placed in the fixing space of the elastomer insert 20 of the support assembly 10.

FIG. 10 then illustrates a last step consisting of operating the forming tool 200 for plastically deforming the second end of the metal support 22 around the tube element 100 and for gripping the tube element 100, the elastomer insert 20 being simultaneously folded in order to surround the tubing element 100.

Of course, the invention is not limited to the embodiments described above. Other embodiments within the range of a person skilled in the art can also be envisaged without departing from the scope of the invention defined by the following claims. In particular, the general form of the head can be cylindrical, oblong, with an oval cross-section. The number of projecting edges can be one or more without departing from the scope of the invention.

The invention claimed is:

1. Collar assembly for fixing at least one tubular article to an external support, of the type comprising a deformable insert for defining a substantially cylindrical cavity configured to receive the tubular article and a metal casing body delimiting a seat substantially inside which the insert is wrapped around the article, the insert comprising an external projection which extends radially towards the exterior of the insert and is configured to cooperate with a corresponding orifice formed in the seat of the metal body so as to position the insert inside the body, the projection comprising a base attached to the insert and a head connected to the base by a radially extending connecting part and provided at the periphery of the head with a protruding clipping edge configured to hold the insert inside the metal casing body, wherein the insert comprises, at the base of the projection, a through hole extending in line with the clipping edge.

2. Assembly according to claim 1, wherein the connecting part radially connects the head according to an external profile without any edge or shoulder.

3. Assembly according to claim 1, comprising two protruding clipping edges opposite one another and two corresponding through holes formed in said base.

4. Assembly according to claim 1, comprising two clipping edges opposite one another and two radially aligned lateral through holes below each of the edges which are joined and form a single through hole extending below the surface of the head.

5. Assembly according to claim 4, wherein the connecting part comprises two flexible skirt sections arranged around the single through hole unique formed by joining the two through holes and opposite one another.

6. Assembly according to claim 1, wherein the connecting part is in the form of a membrane joining the head and the base of the insert.

7. Assembly according to claim 1, wherein the head is formed by a hollow body.

8. Assembly according to claim 1, wherein the head extends substantially in radial extension of the through hole and the connecting part connects the head to the base at the periphery of the through hole.

9. Assembly according to claim 1, wherein the head is supported at a radial distance from said base by the connecting part and extends substantially over the entire surface of the through hole.

10. Assembly according to claim 1, wherein the head of the projection has a solid form with four lateral sides, two opposite sides extending laterally by two projecting clip edges and the two other opposite sides extending laterally by two flexible skirt sections forming the connecting part.

11. Assembly according to claim 1, wherein the insert is elastically deformable between an undeformed open position and a deformed closed position, the insert having in the open position a generally semi-tubular U-shaped cross-section with a base and side walls, the projection being supported by the base of the insert.

* * * * *